(12) United States Patent
Sherwin et al.

(10) Patent No.: US 6,254,156 B1
(45) Date of Patent: Jul. 3, 2001

(54) ROLLING BLADE CUP GRIPPER

(75) Inventors: John P. Sherwin, Wauwatosa; David R. Voves, Mukwonago, both of WI (US)

(73) Assignee: ABB Flexible Automation, Inc., New Berlin, WI (US)

( * ) Notice: Subject to any disclaimer, the term of this patent is extended or adjusted under 35 U.S.C. 154(b) by 0 days.

(21) Appl. No.: 09/365,314

(22) Filed: Jul. 30, 1999

(51) Int. Cl.[7] .............................. B25J 15/08; B65G 47/90
(52) U.S. Cl. ........................................ 294/87.1; 294/103.1
(58) Field of Search ................................ 294/63.1, 67.31, 294/81.6, 81.61, 87.1, 88, 99.1, 100, 103.1, 110.1, 116; 53/247; 414/729, 751; 901/31, 37–39

(56) References Cited

U.S. PATENT DOCUMENTS

| 1,729,330 | 9/1929 | Dart . |
| 2,365,930 | 12/1944 | Bayhi et al. . |
| 2,863,579 | * 12/1958 | Meyer .............................. 294/87.1 X |
| 2,902,311 | 9/1959 | Reel . |
| 3,472,401 | 10/1969 | Scaperotto . |
| 3,929,368 | * 12/1975 | Ryden et al. ...................... 294/103.1 |
| 4,384,739 | 5/1983 | Gustavsson et al. . |
| 4,545,608 | * 10/1985 | Dodd .................................. 294/87.1 |
| 5,463,847 | 11/1995 | Alexander et al. . |

FOREIGN PATENT DOCUMENTS

| 656035 | * 12/1964 | (BE) | .................................... 294/87.1 |
| 3741257 | * 6/1989 | (DE) | .................................... 294/87.1 |
| 127391 | * 5/1990 | (JP) | .................................... 294/87.1 |
| 173690 | * 6/1992 | (JP) | .................................... 294/87.1 |

* cited by examiner

Primary Examiner—Johnny D. Cherry
(74) Attorney, Agent, or Firm—Nicholas A. Kees; Godfrey & Kahn, S.C.

(57) ABSTRACT

An end effector for handling stacks of plastic cups, dishes, and similar items. The end effector includes a bracket for coupling the end effector to the end of a robot arm. A main plate or body with a top side, a bottom side, and a plurality of apertures is connected to the bracket and supports the major components of the end effector. The end effector includes at least one bay positioned in the bottom side of the main body. Within each bay is a multiple-piece blade support block that helps guide the blades located within the bay. One or more roller blocks are positioned at predetermined points along the length of the bay, preferably between two pieces of the blade support block. Each roller block has an arcuate track that holds a roller assembly. Each roller assembly has a link which extends through one of the apertures in the main body. Each roller assembly is also coupled to a curved blade. One or more linear actuators are positioned on the top side of the main body. The driven rod of each actuator is coupled to one or more of the roller assembly links. When the actuators are activated, the roller assemblies move in their tracks and the blades slide between an open position and a closed position.

12 Claims, 10 Drawing Sheets

ROLLING BLADE CUP GRIPPER

BACKGROUND OF THE INVENTION

The present invention relates to end effectors used with robots. More specifically, the present invention relates to an end effector having rolling blades to pick up cups and similar items.

Robots carry out tasks with speed, accuracy, and repeatability that can not be matched by manual techniques. They are used in a variety of applications, from welding to picking up and handling all sorts of items. In order to carry out these tasks, robots are equipped with "end effectors," devices designed to effect a desired action. End effectors often take the form of mechanical fingers, claws, or jaws that mechanically compress articles between two members. While these types of end effectors (sometimes called "grippers") are effective for use in industrial environments and to manipulate objects that are hard and relatively heavy, they are not useful for handling lighter, delicate, or easily crushed items.

For example, plastic glasses and cups are difficult to handle using typical robot grippers because they are usually made from materials that can be crushed or broken relatively easily. In addition, cups and glasses are often placed inside one another to create hard-to-handle, large stacks. The stacks can be unstable if they are not grasped along their entire length. It is also difficult to remove and place stacks of items in boxes and similar containers, because the area within such containers is limited and stacks are often surrounded on three sides (either by another stack or a wall of the container). This makes it difficult to grab or grip the stack without damaging the container or other stacks. Accordingly, the packing and unpacking of cups and similar items is often done using manual or semi-automated mechanisms. However, if an end effector existed that could grasp stacks of such items and deliver such items without damage, in the confines of a container, the benefits of robotic automation could be realized.

SUMMARY OF THE INVENTION

Therefore, it is an objective of the present invention to provide a robot end effector that can grasp stacks of cups, glasses, and similar items. This objective and others are achieved in an end effector having a mounting bracket or similar mount designed to be coupled to the arm of a robot. A main plate or body with a top side, a bottom side, and a plurality of apertures is connected to the bracket and supports the major components of the end effector.

The end effector includes at least one bay positioned in the bottom side of the main body. Each bay is defined by two side walls and is sized and shaped such that it can hold two parallel stacks of cups, glasses, or similar items. Within each bay is a multiple-piece blade support block that runs substantially the entire length of the bay and acts as a guide for the blades located within the bay. One or more roller blocks are positioned at predetermined points along the length of the bay, preferably between two pieces of the blade support block. Each roller block has an arcuate track that holds a roller assembly. Each roller assembly has a shaft which extends through one of the apertures in the main body. Each roller assembly is also coupled to a curved blade. One or more linear actuators are positioned on the top side of the main body. The drive shafts of each actuator are coupled to one or more of the roller assembly shafts. When the actuators are activated, the roller assemblies move in their tracks and the blades slide between an open position and a closed position.

In one embodiment, the end effector includes two actuators, three bays formed on the bottom of the main body, and each bay contains a pair of blades. The drive shaft from one of the actuators is coupled to a drive link that is connected to three roller assembly shafts and the drive shaft from the other actuator is coupled to a second drive link coupled to a second set of three roller assembly shafts. As each linear actuator moves between a retracted position and an extended position, it moves each of the three pairs of blades between an open position and a closed position.

In use, the end effector is coupled to a conventional, programmable, industrial robot which may move the end effector to desired locations between a stacking station and an open box or carton to be filled with stacks of plastic cups. For example, with the blades in the end effector in an open position, it may be moved down over a layer of parallel stacks of cups at a stacking station on a manufacturing line. Once the end effector is in place, the blades are moved to their closed position so that a portion of each blade is positioned partially under one stack of cups. With each stack so gripped, the end effector can then be raised by the robot and moved to a drop-off location such as an open box or carton. The cycle can be repeated to fill the carton and then to fill multiple cartons. Advantageously, this gripping and loading task is accomplished without the need to apply the typical contact and compression forces used in most end effectors, as the only force impacting the gripped items is their own weight against the blades.

Another advantage of the present invention is that gripping and releasing of the items can be accomplished in a confined space (such as a box or carton) because the curved blades remain within each bay at all times. Thus, unlike many known grippers and end effectors, the grasping elements do not extend beyond and outside of the end effector in order to successfully surround and then hold the objects of interest.

Still further objectives and features of the present invention will become apparent by a review of the description below and accompanying drawings.

DESCRIPTION OF THE PREFERRED EMBODIMENTS

Figure 1:
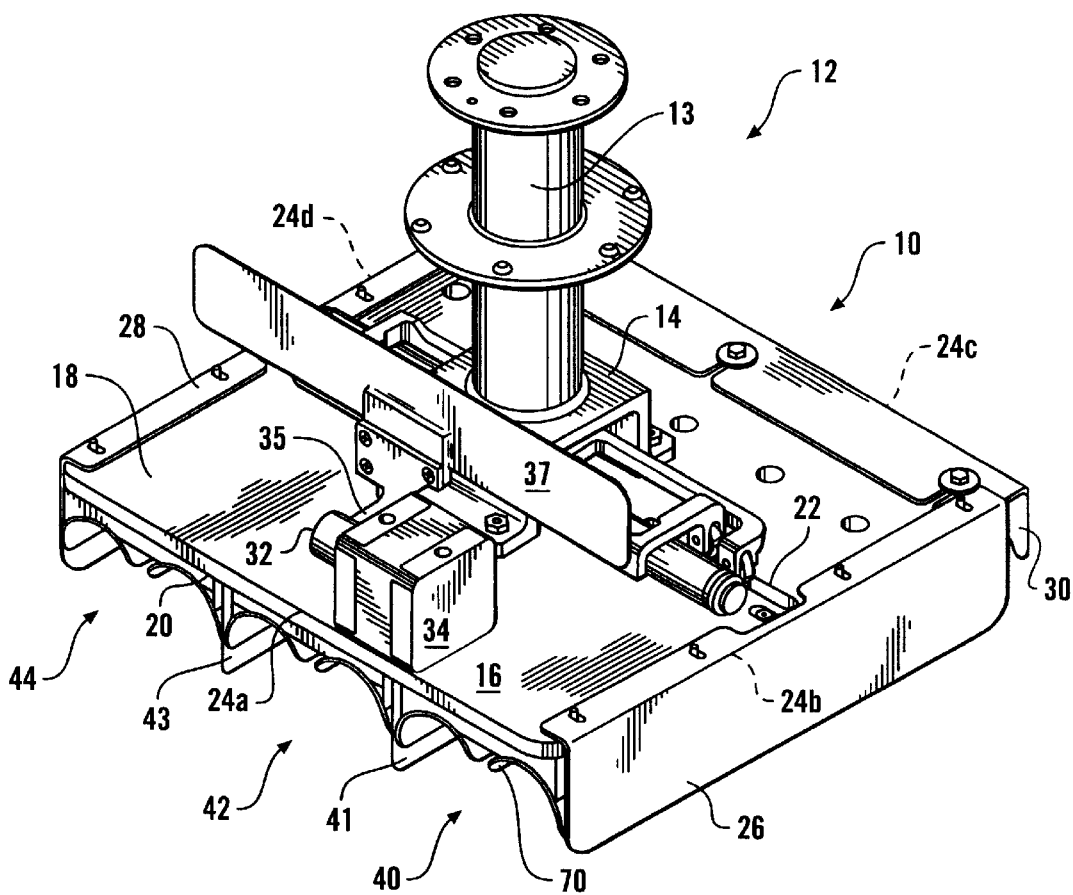
FIG. 1 is an isometric view of an end effector constructed in accordance with the teachings of the present invention.
Figure 2:
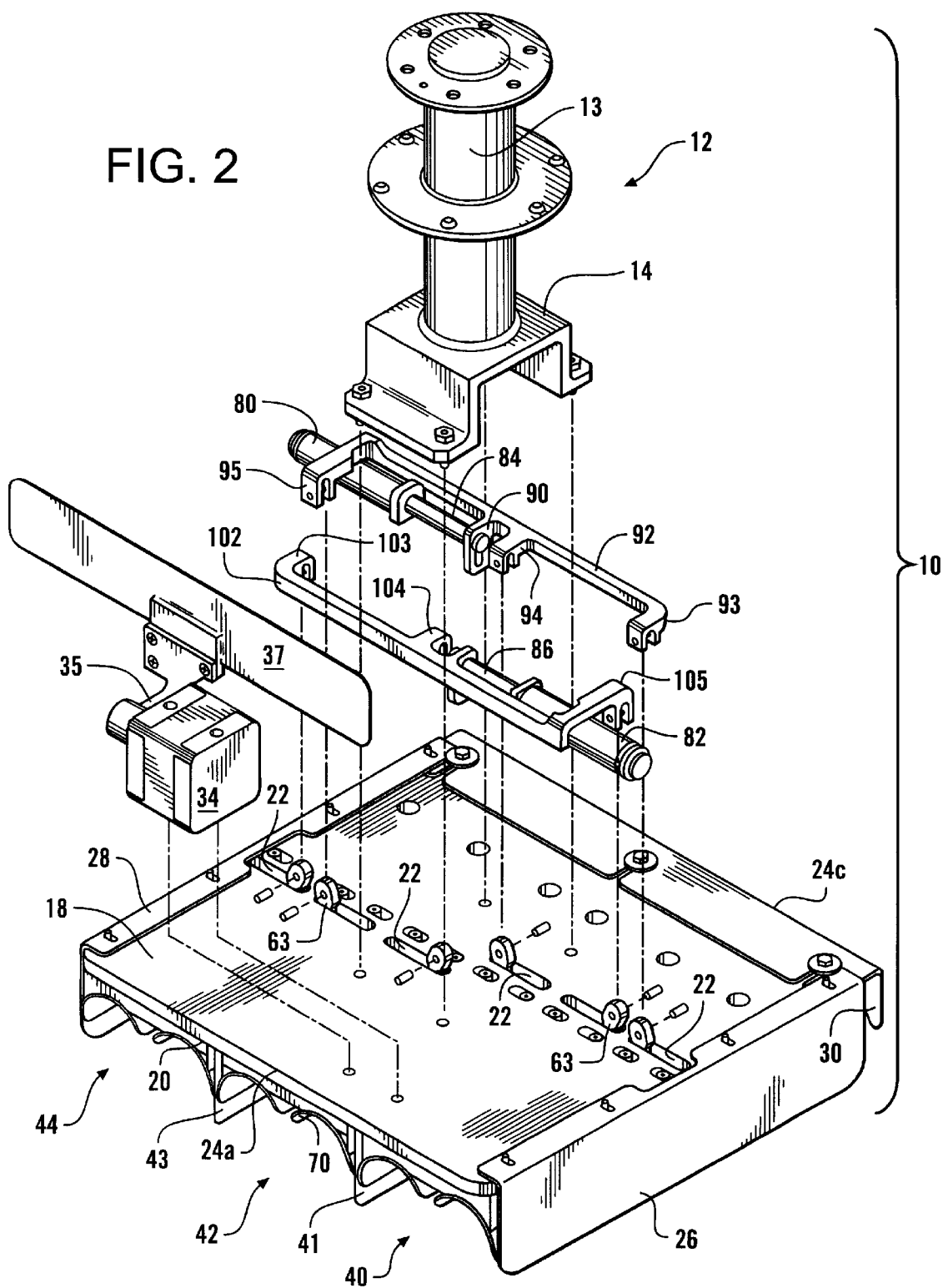
FIG. 2 is an exploded view of the end effector shown in FIG. 1.

An end effector 10 constructed in accordance with the present invention is shown in FIGS. 1 and 2. The end effector 10 includes an extension-arm and bracket assembly 12 designed to be coupled to the arm (not shown) of a robot (also not shown). The assembly 12 includes an arm 13 and a bracket 14. However, while the end effector 10 is shown with the assembly 12, numerous devices could be used to couple the end effector 10 to a robot.

Figure 3:
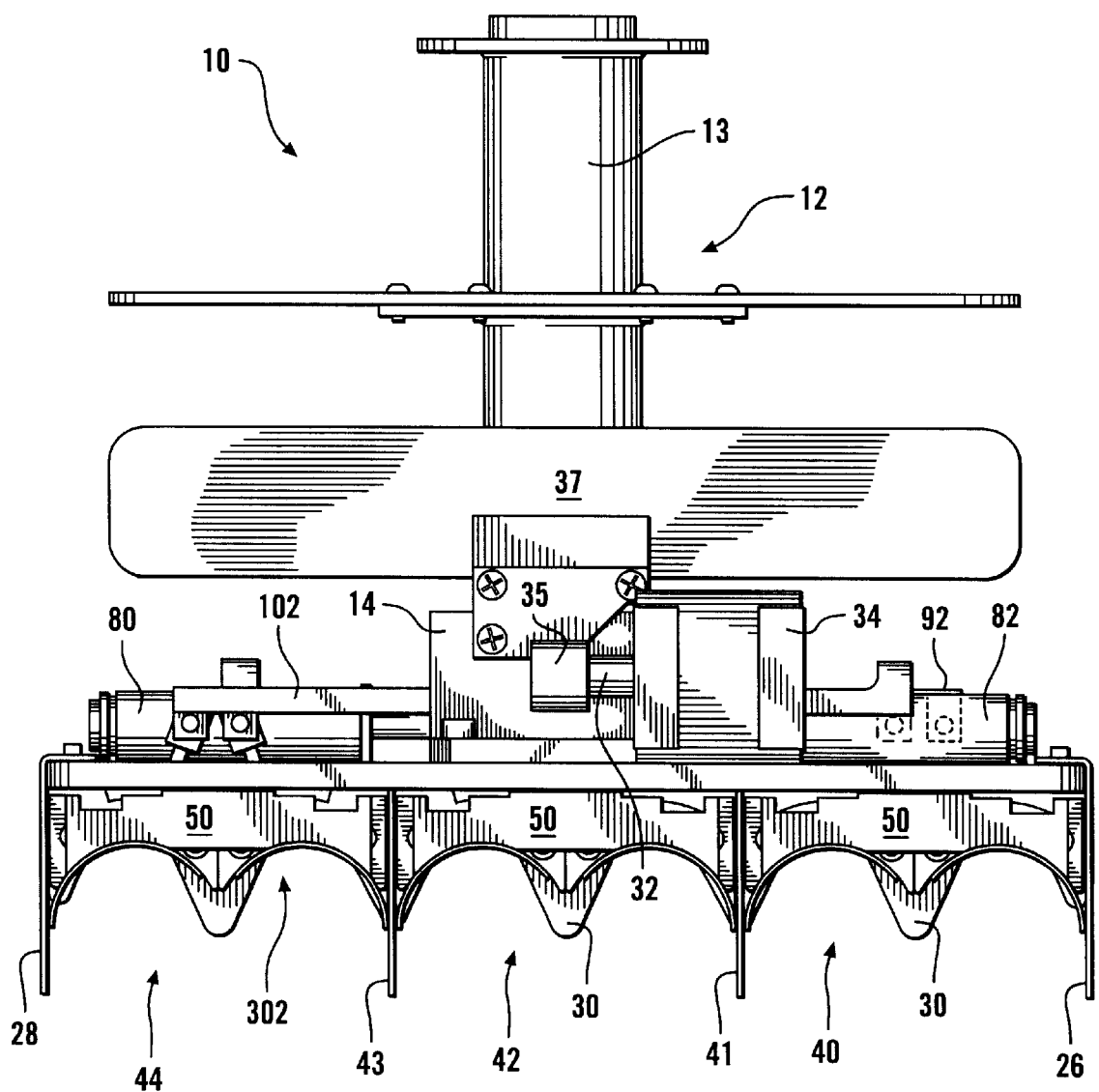
FIG. 3 is a front view of the end effector of FIG. 1.
Figure 4:
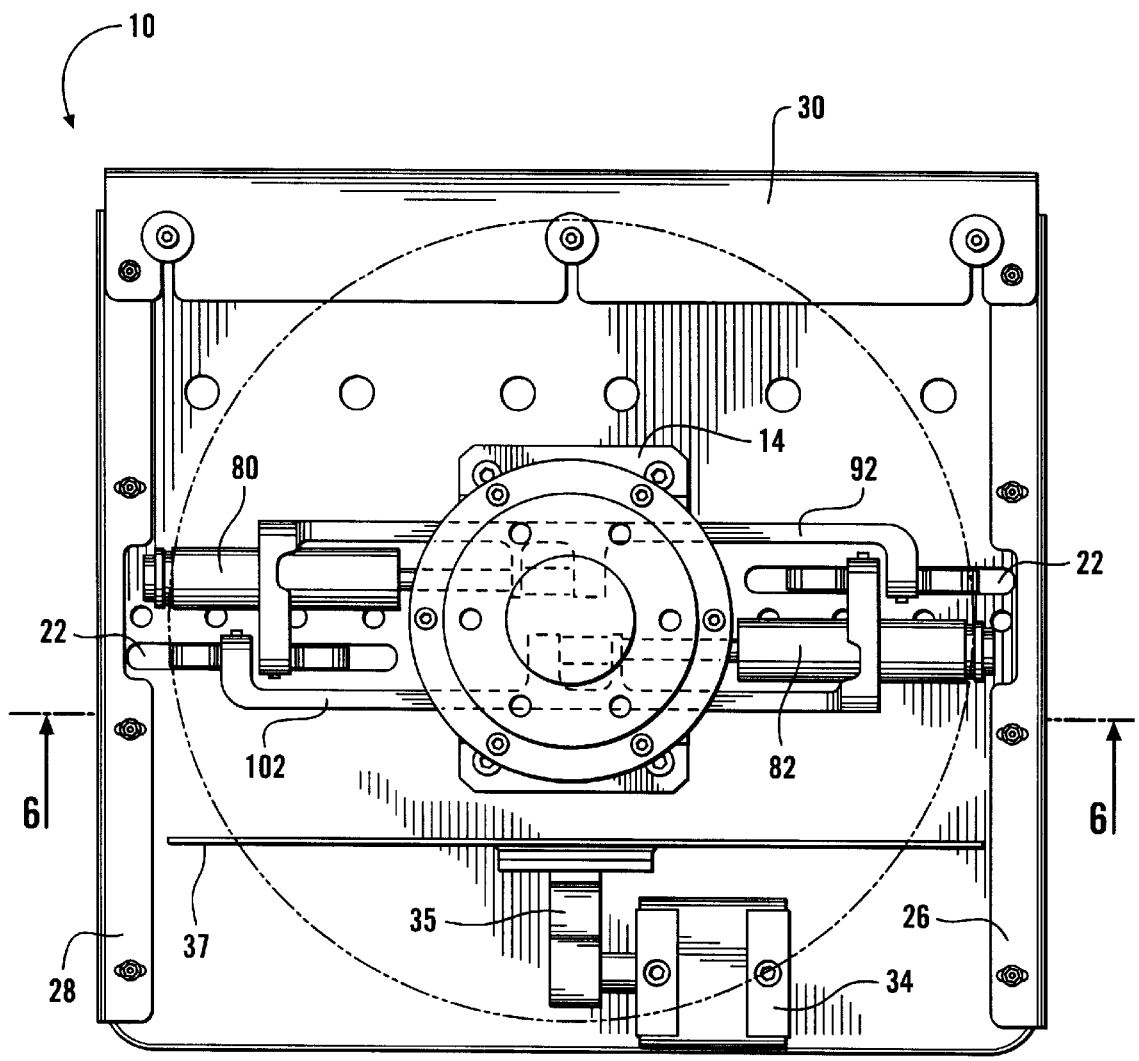
FIG. 4 is a top view of the end effector shown in FIG. 1.
Figure 5:
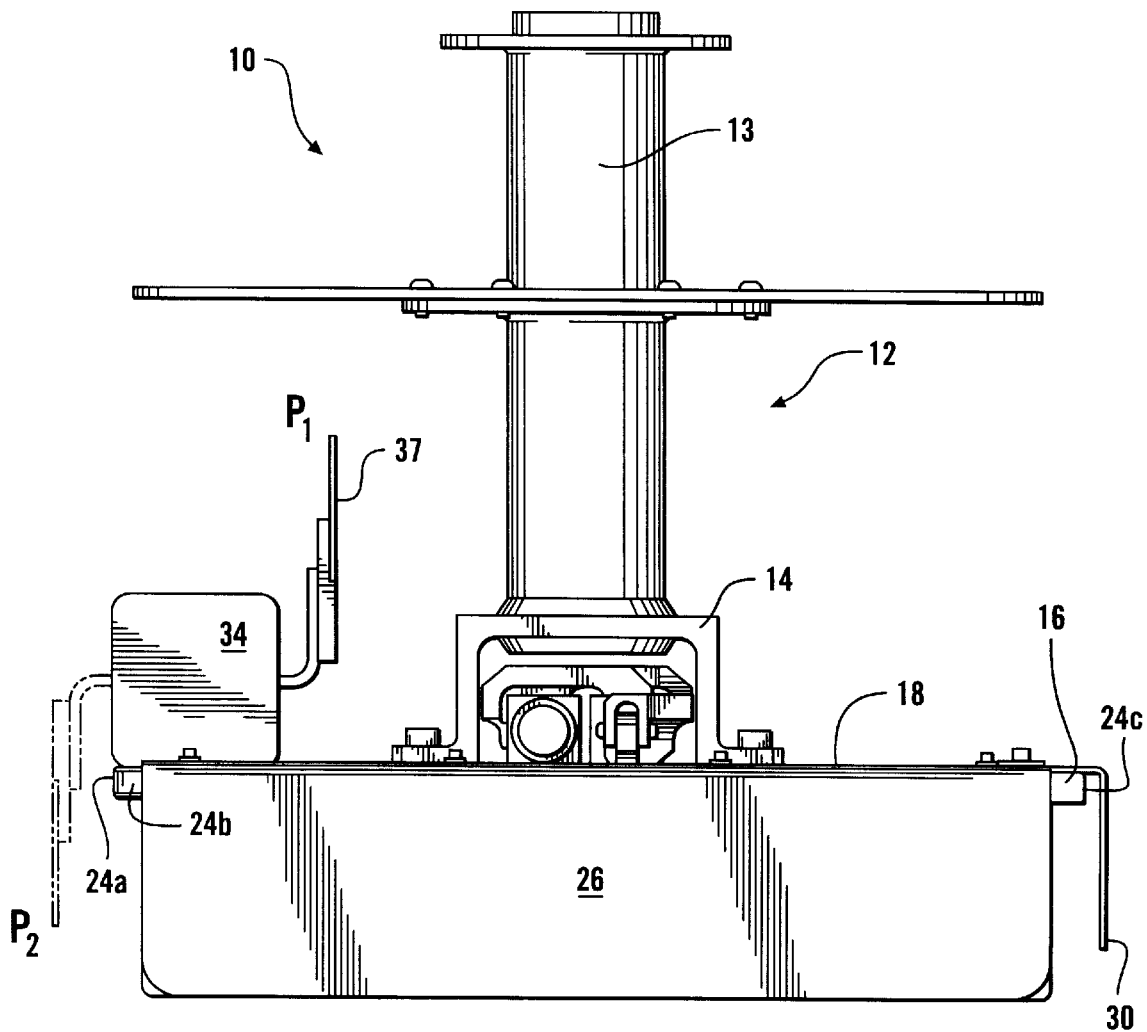
FIG. 5 is side view of the end effector shown in FIG. 1.
Figure 8:
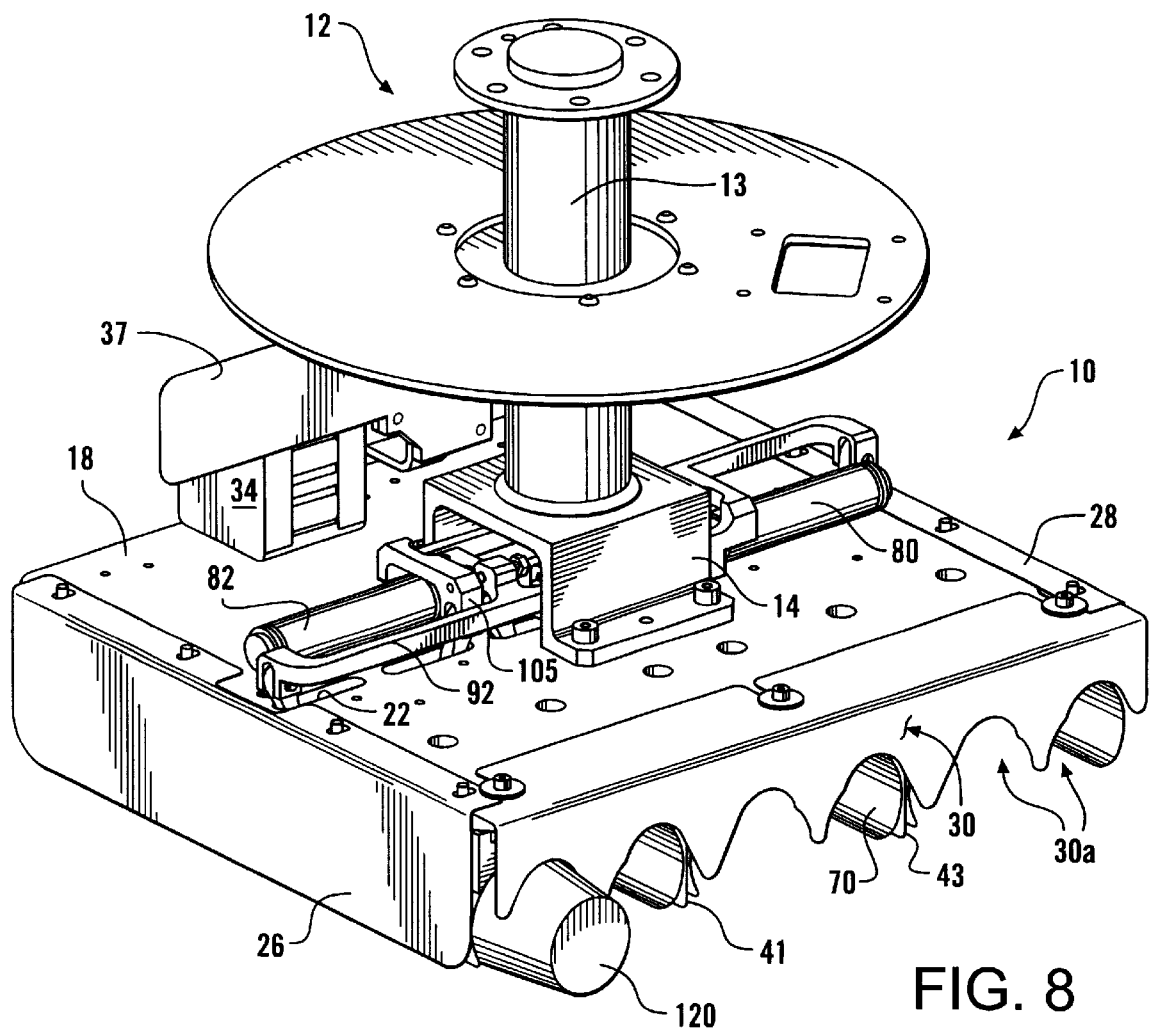
FIG. 8 is an isometric of the end effector shown in FIG. 1, from a reverse angle.
Figure 9:
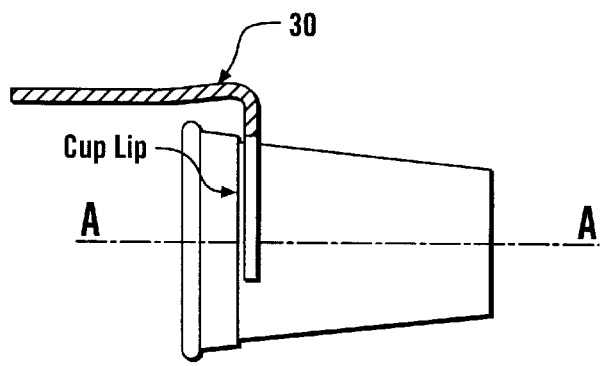
FIG. 9 is a fragmentary cross sectional view of a portion of the end effector shown in FIG. 8.

The bracket 14 is coupled to a main plate or body 16 that has a top side 18, a bottom side 20, and a plurality of elongated apertures 22 designed to receive roller assembly shafts (described below). In the embodiment shown, the main body 16 has a rectangular-shape and first, second, third, and fourth sides, 24a, 24b, 24c, and 24d. Side walls or blades 26 and 28, preferably formed of stainless steel in food-related applications, are mounted on the second and fourth sides 24b and 24d, respectively. A serpentine blade 30 (also preferably of stainless in food applications), best seen in FIGS. 3 and 8, is mounted on the third side 24c. Near the first side 24a is a motor or similar rotary actuator 34 with a drive shaft 32. Mounted on the drive shaft 32 is an arm 35 which supports a blade 37. The rotary actuator 34 is operable to move the blade 37 between a first position P1 (FIG. 5), above the body 16, and a second position P2, parallel to the serpentine blade 30. The blades 26, 28, 30, and 37 help guide and hold items to be gripped by the end effector 10 and the blades 26 and 28 partially define a plurality of bays (discussed below) positioned under the main body 16. The serpentine blade 30 includes partial openings 30a sized and positioned to, as shown in FIG. 9, fit over the lip of a cup 120 at the end of a stack.

Figure 2A:
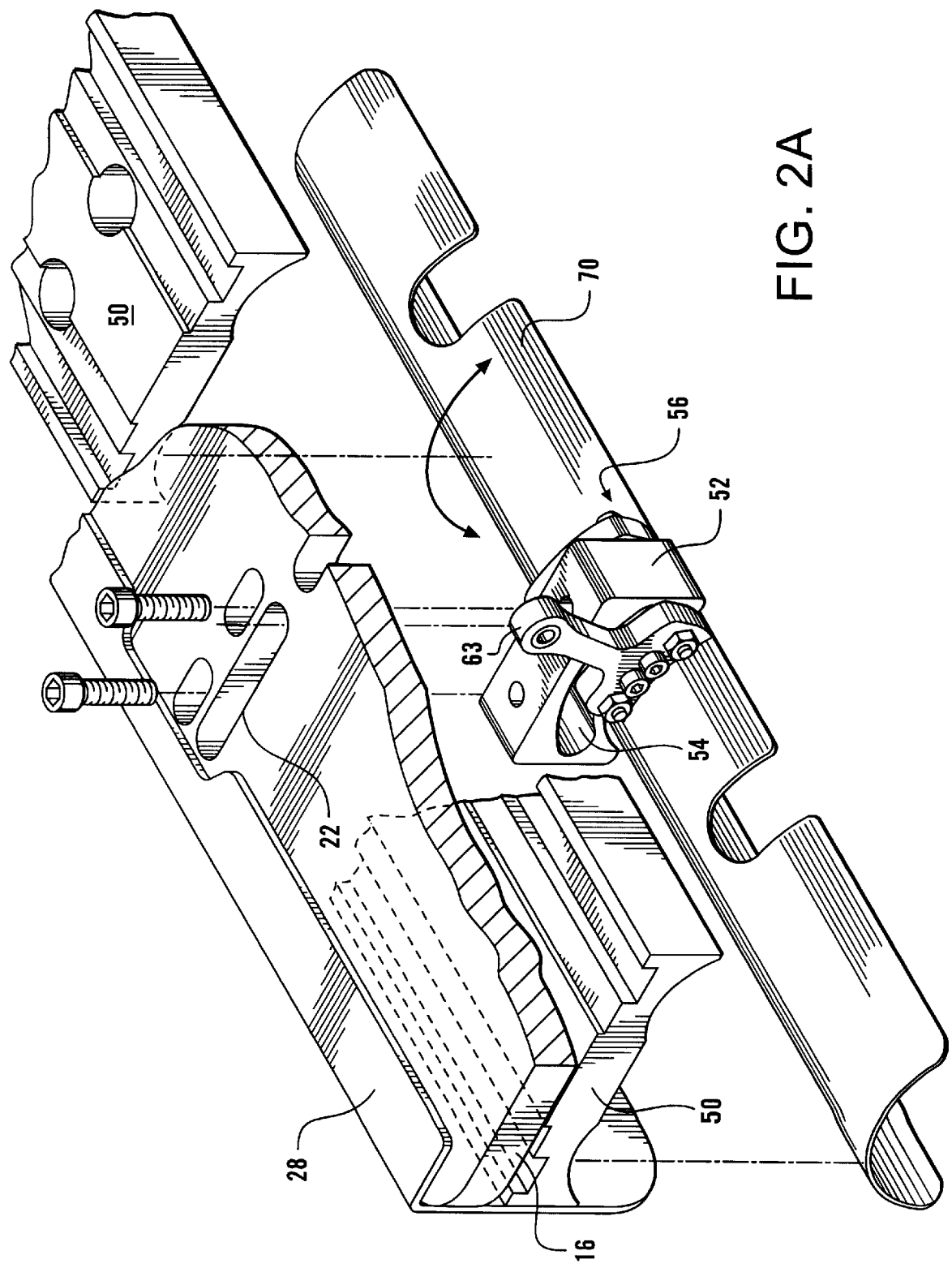
FIG. 2A is an enlarged, partially cut away, perspective view of a bay in the end effector of the present invention with a blade coupled to a roller assembly.
Figure 2B:
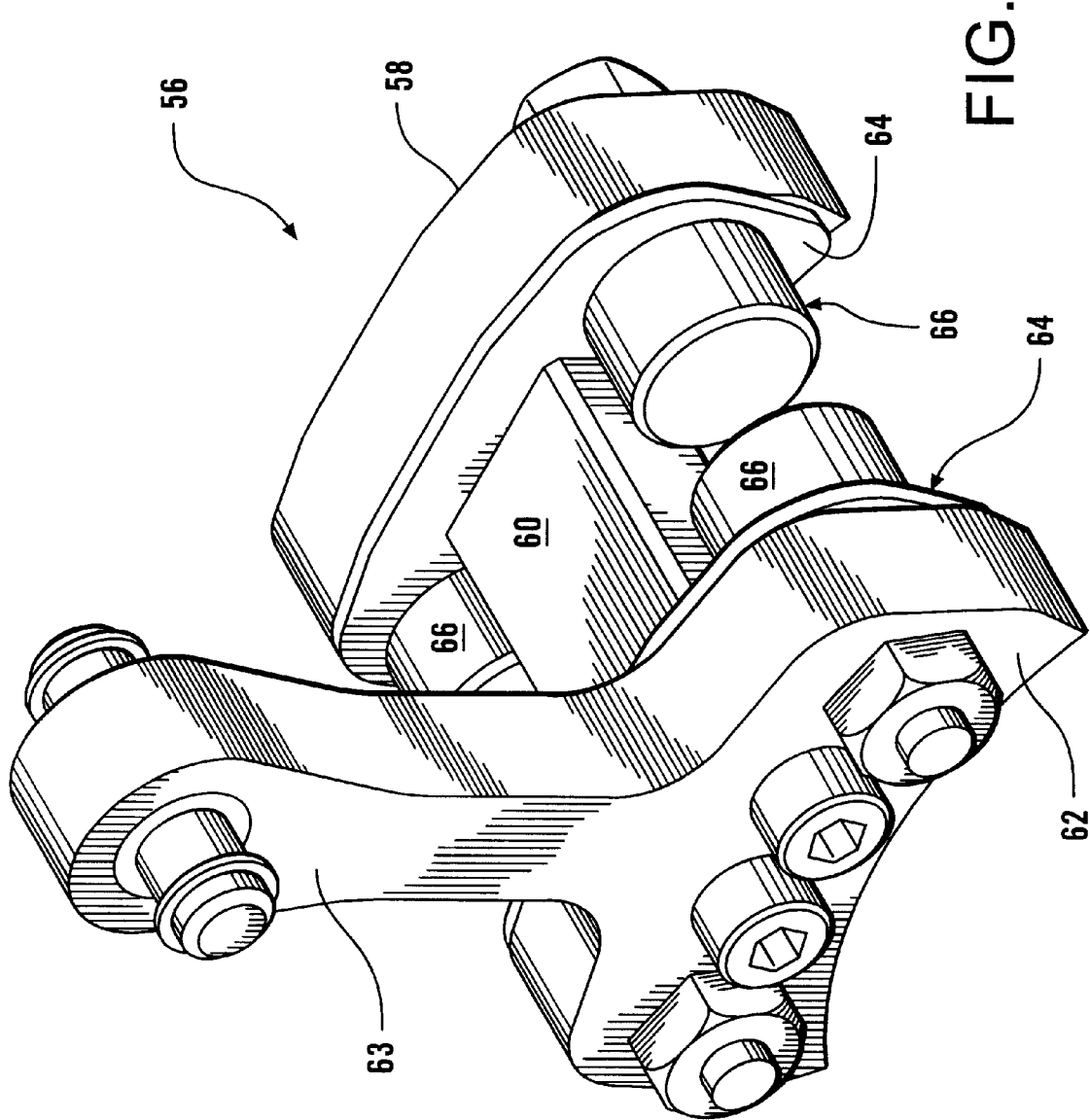
FIG. 2B is an enlarged, perspective view of a roller assembly used in the present invention.

In the embodiment shown, the end effector 10 includes three bays: a bay 40 defined by the blade 26 and a first divider 41; a second bay 42 defined by the first divider 41 and a second divider 43; and a third bay 44 formed by the second divider 43 and the blade 28. Dividers 41 and 43 are also preferably formed of stainless in food-related applications. As best seen by reference to FIG. 2A, within each bay 40, 42, and 44 are two, multiple-piece blade support blocks 50 that run substantially the entire length of the bay. The blade support blocks 50 are formed of a low friction plastic such as nylon, and act as a guide for the blades located within each bay. A roller block 52 is positioned at a predetermined point along the length of each bay, preferably between two pieces of each blade support block 50. Each roller block 52 has an arcuate track 54 that holds a roller assembly 56 (FIG. 2B). The roller assembly 56 has a first arm 58, a connecting member 60, a second arm 62 with a link 63, two thrust spacers 64, formed of a low friction plastic, and a plurality of rollers 66. Each link 63 extends through one of the apertures 22 in the main body 16. Each of the arms 58 and 62 is coupled to a single curved blade 70 (FIG. 2A) and, in the embodiment shown, the end effector 10 includes six curved blades 70. Blades 70 are again preferably formed of stainless steel in food-related applications.

Figure 6:
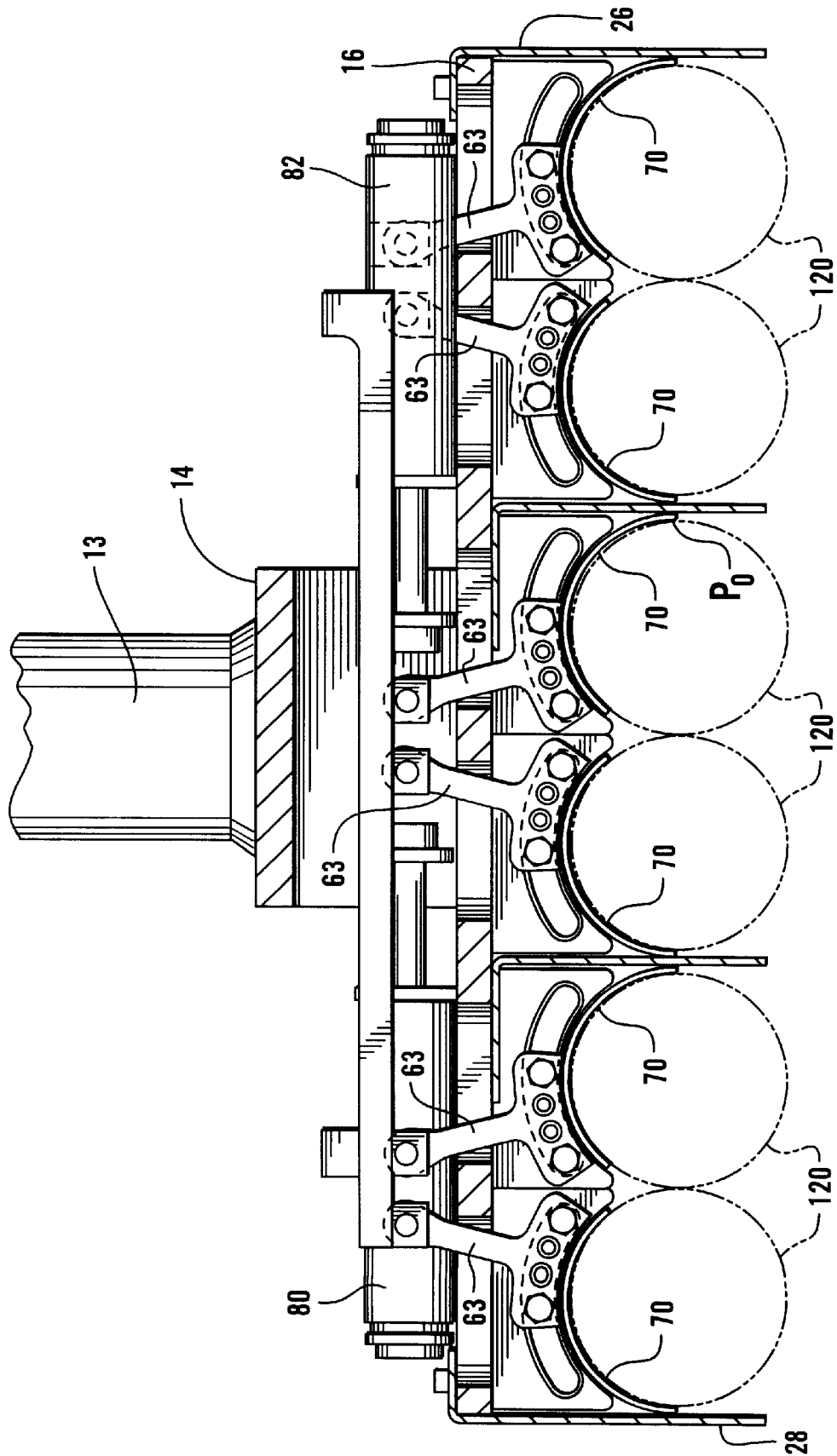
FIG. 6 is a cross-sectional view of the end effector of FIG. 1 taken along the line 6—6 of FIG. 4 showing the rolling blades in a first, open position.
Figure 7:
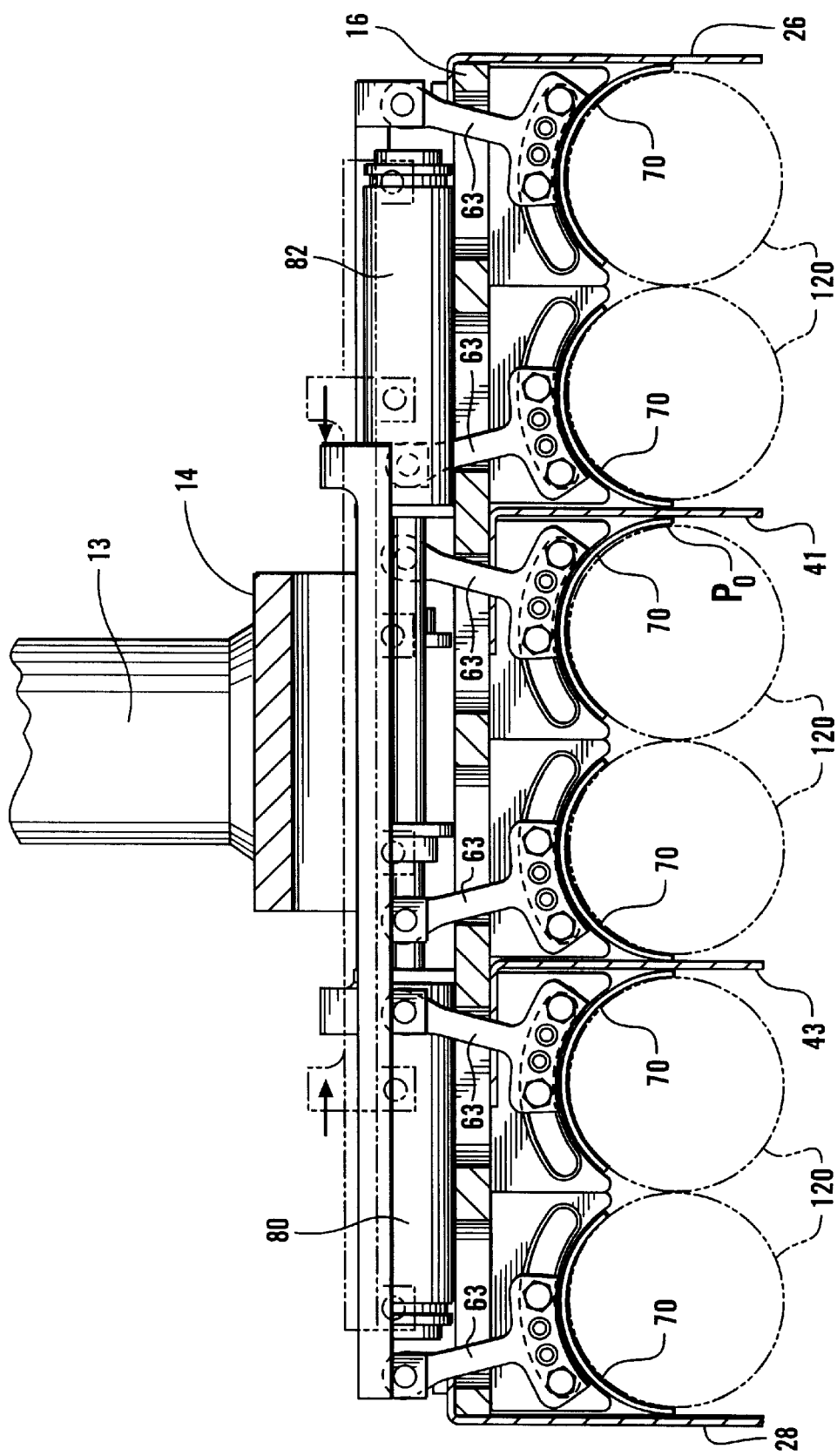
FIG. 7 is a cross-sectional view of the end effector of as in FIG. 6 showing the rolling blades in a second, closed position.

First and second linear actuators 80 and 82 are positioned on the top side 18 of the main body 16 and each has a driven rod 84 and 86, respectively. The driven rod 84 is coupled to a yoke 90 of an actuator extender 92. In this embodiment the actuator extender 92 has three legs 93, 94, and 95. Similarly, the driven rod 86 is coupled to the yoke 100 of an actuator extender 102 with three legs 103, 104, and 105. The legs 93, 94, 95 are each pivotably coupled to a respective one link 63 from one roller assembly 56 such that the actuator 82 is coupled to three blades 70 positioned on the left-hand side of each bay. The legs 103, 104, and 105 are each pivotably coupled to one link 63 from one roller assembly 56 such that the actuator extender 102 is coupled to the curved blades 70 positioned on the right-hand side of each bay. As each linear actuator 80, 82 moves between a retracted position and an extended position, the actuator causes each roller assembly coupled to it to move in its respective track 54. When the roller assemblies move, each of the three pairs of blades are moved between an open position $P_O$ (FIG. 6) and a closed position $P_C$ (FIG. 7).

It should be understood, of course, that the end effector could include more than or less than three bays by modifying the main body 16, extenders 92 and 102, adding or subtracting dividers, and providing appropriately powerful actuators 80, 82. Thus, the end effector 10 could be adapted to work in a variety of situations.

In use, the end effector 10 is coupled to a conventional, programmable, industrial robot which may move the end effector 10 to and from desired locations, such as between a stacking station and an open box or carton. More particularly, with the blades 70 in the end effector 10 in the open position $P_O$, it may be moved down over a layer of parallel stacks of cups 120 (shown in phantom in FIGS. 6 and 7) at a stacking station on a manufacturing line (not shown). Once the end effector 10 is in place, the blades 70 are moved to their closed position $P_C$ so that a portion of each blade 70 is positioned partially under one stack of cups. Then, the actuator 34 drives the blade 37 from the first position P1 to the second position P2 to protect the load of cups now gripped by the end effector 10. With each stack 120 so gripped, the end effector 10 can be raised by the robot and moved to a drop-off location such as an open box or carton. The cycle can be repeated to fill the carton and then multiple cartons. Advantageously, this gripping and loading task is accomplished without the need to apply the typical contact and compression force used in most end effectors, as the only force impacting the gripped items is their own weight against the blades. Further, since the blades 70 remain within the bays 40, 42, 44, the entire main body 16 may be inserted into a carton or box without concern for providing proper clearance, which is usually required for conventional grippers to grasp and release items.

As can be seen from the above discussion, one of the unique features of the present invention is that it grips easily damaged and hard to handle items such as stacks of plastic cups without crushing or damaging them. Further, the gripping mechanism in the present invention does not require large amounts of space to open and close. Thus, the present invention may operate in confined areas such as within a container or box. The invention is versatile as it may be implemented in a number of configurations to accommodate situations where the number and size of stacks varies from what has been shown and discussed. Accordingly, while the present invention may be used to handle plastic cups, other items such as plates, bowls, and dishes may be gripped with an end effector constructed according to the teachings presented herein. Thus, the present invention is not limited to the specific details set forth, but embraces all forms that come within the scope of the following claims.

What is claimed is:

1. An end effector comprising:
    a main body having at least one aperture, a first side, and a second side;
    a roller assembly coupled to the second side of the main body and having a shaft, at least a portion of the shaft inserted through the at least one aperture in the main body;
    a blade coupled to the roller assembly and adjacent a side wall; and an actuator mounted on the first side of the main body and coupled to the shaft.

2. The end effector as in claim 1, further comprising a bay positioned under the second side of the main body and wherein the roller assembly and blade are positioned within the bay.

3. The end effector as in claim 2, further comprising a roller block coupled to the second side of the main body, the roller block having an arcuate track and holding the roller assembly.

4. The end effector as in claim 3, wherein the roller assembly includes a first arm, a second arm with a shaft, a connecting member coupling the first arm to the second arm, and a plurality of rollers.

5. An end effector comprising:
a plate-like main body having a plurality of apertures, a first side, and a second side;
a plurality of bays positioned under the main body, each bay including
a support block,
a roller block positioned adjacent to the support block and having an arcuate track;
a roller assembly held by the roller block and having a link inserted through one of the apertures in the main body;
a blade coupled to the roller assembly; and
an actuator coupled to the link.

6. The end effector as in claim 5, wherein the roller block has an arcuate track.

7. The end effector as in claim 6, wherein the roller assembly includes a plurality of rollers that ride in the arcuate track.

8. The end effector as in claim 5, wherein the main body further includes two side walls.

9. The end effector as in claim 8, further comprising a serpentine blade positioned adjacent to the two side walls.

10. An end effector comprising:
a main body having a plurality of apertures, a first side, a second side, a third side and a fourth side, wherein two side walls are mounted on the second side and the fourth side;
a plurality of bays positioned under the main body, each bay including
a support block,
a roller block positioned adjacent to the support block and having an arcuate track;
a roller assembly held by the roller block and having a link inserted through one of the apertures in the main body, a first blade coupled to the roller assembly, and a first actuator coupled to the link; and
a second actuator mounted on the first side of the main body, an arm coupled to the second actuator and a second blade coupled to the arm, wherein the second blade is moveable between a first position, above the body, and a second position, adjacent the two side walls.

11. An end effector comprising:
a main body having a plurality of apertures;
a plurality of bays positioned under the main body, each bay having
a multiple-piece support block,
a first of two roller blocks, each roller block positioned between two pieces of the multiple-piece support block and having an arcuate track;
a first roller assembly held by the first roller block and having a link;
a first blade coupled to the first roller assembly;
a second roller block positioned between two pieces of the support block and having an arcuate track;
a second roller assembly held by the second roller block and having a link;
a second blade coupled to the second roller assembly;
a first actuator coupled to the links of the first roller assemblies; and
a second actuator coupled to the links of the second roller assemblies.

12. The end effector as in claim 11, further comprising a first actuator extender coupled between the first actuator and the links of the first roller assemblies; and a second actuator extender coupled between the second actuator and the links of the second roller assemblies.

* * * * *